(No Model.) 2 Sheets—Sheet 2.

L. EPSTEIN.
SECONDARY VOLTAIC BATTERY.

No. 606,526. Patented June 28, 1898.

Witnesses
John Irwin
Albert H. Norris

Inventor
Ludwig Epstein
by James L. Norris
His Attorney

United States Patent Office.

LUDWIG EPSTEIN, OF LONDON, ENGLAND.

SECONDARY VOLTAIC BATTERY.

SPECIFICATION forming part of Letters Patent No. 606,526, dated June 28, 1898.

Application filed December 28, 1895. Serial No. 573,649. (No model.) Patented in France December 21, 1894, No. 11,414; in England December 21, 1895, No. 24,516; in Belgium December 21, 1895, No. 118,982; in Canada January 15, 1896, No. 51,045, and in Italy January 23, 1896, LXXIX, 181, and XXX, 40,405.

*To all whom it may concern:*

Be it known that I, LUDWIG EPSTEIN, a citizen of Austria, residing at 28 Victoria street, Westminster, London, England, have invented new and useful Improvements in Secondary Voltaic Batteries, (for which I have obtained Letters Patent in Great Britain, dated December 21, 1895, No. 24,516; in Belgium, dated December 21, 1895, No. 118,982; in France, dated December 21, 1894, No. 11,414; in Italy, dated January 23, 1896, Vol. LXXIX, No. 181, and Vol. XXX, No. 40,405, and in Canada, dated January 15, 1896, No. 51,045,) of which the following is a specification.

This invention relates to secondary voltaic battery-cells, and has for its object to provide new and improved means for obtaining great electrical energy from comparatively small weight and to guard against short-circuiting by fragments of the active material and loss of mercury from amalgamated plates. This object is accomplished in the manner and by the means hereinafter described and claimed, reference being made to the accompanying drawings, in which—

Figure 1:
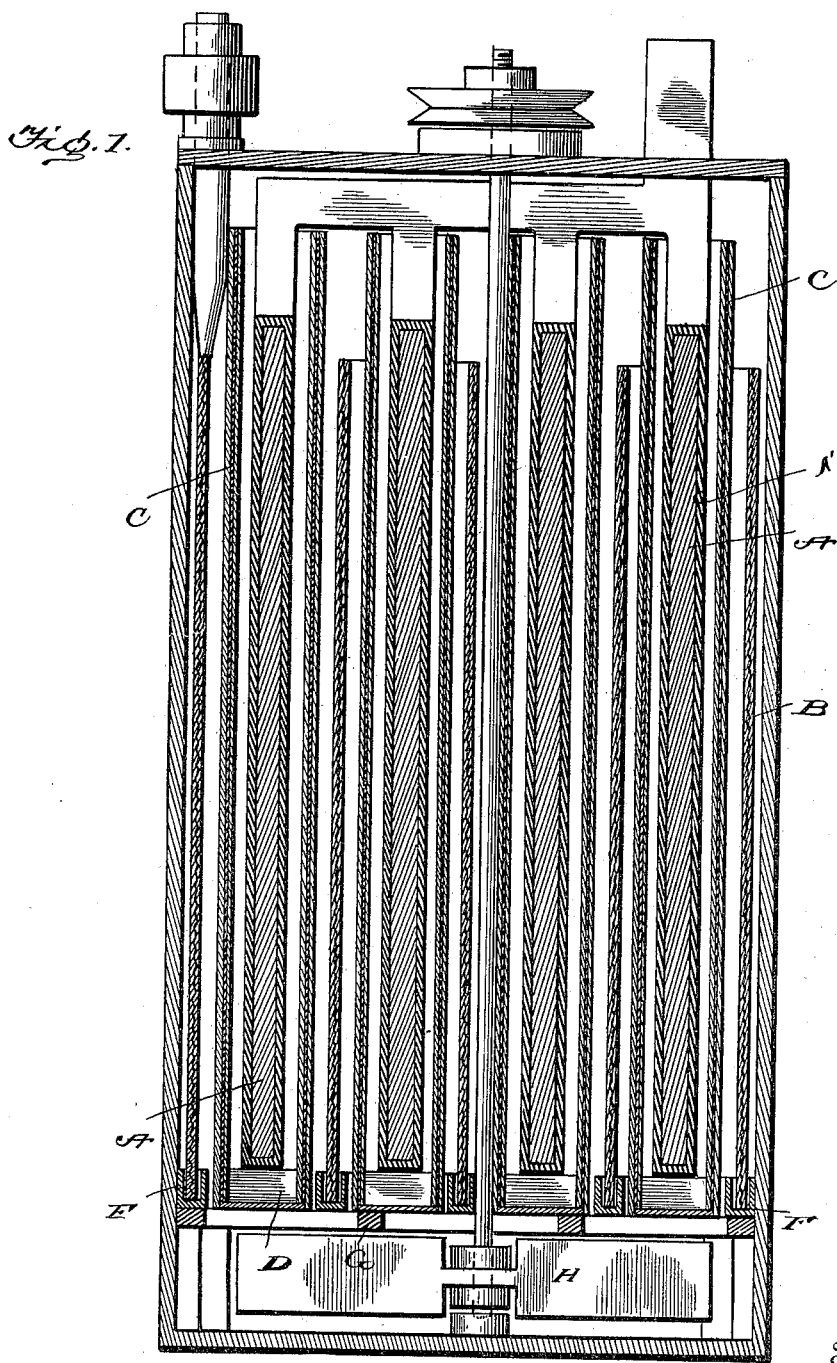
Figure 2:
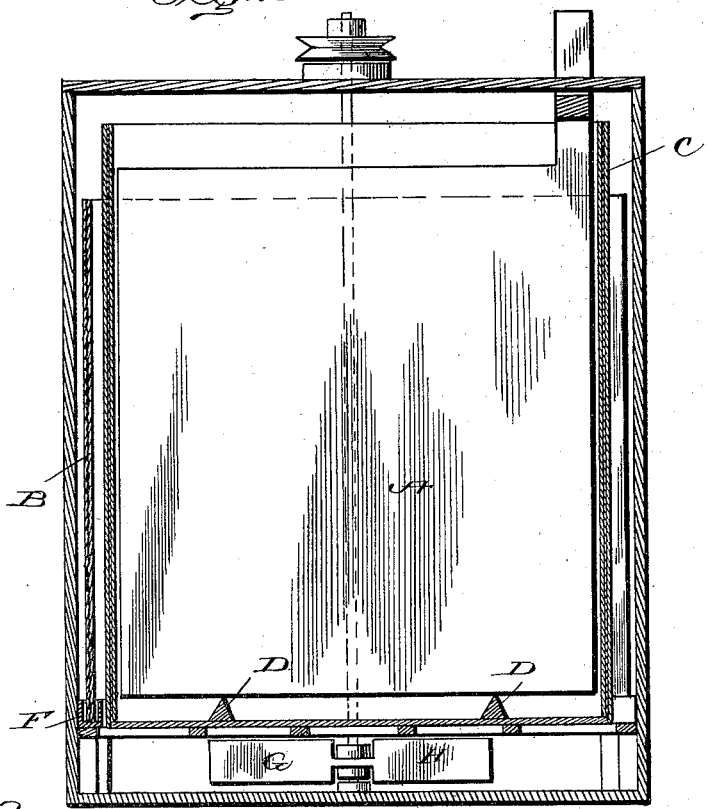
Figure 3:
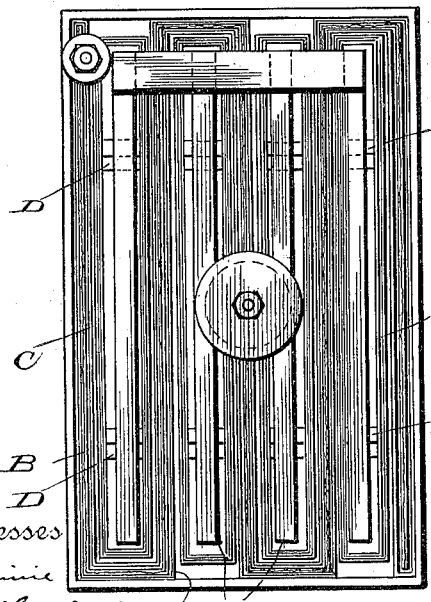
Figure 4:
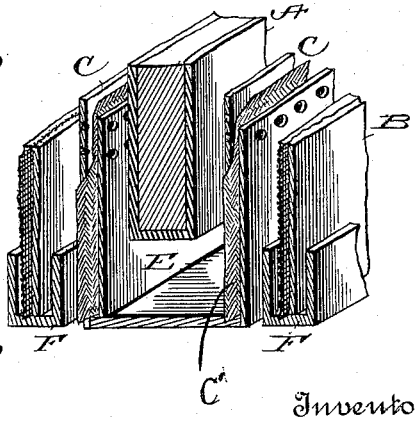

Figures 1 and 2 are vertical sections on planes at right angles to each other, showing a secondary cell embodying my invention. Fig. 3 is a plan view with the cover removed; and Fig. 4 is a perspective view, on an enlarged scale, showing one form of the casings and troughs employed.

In describing my invention the terms used are with reference to the apparatus when set up for use as a battery.

The letter A indicates the negative plates, which may be of any known construction, having peroxid of lead—for example, as at A'—as active material, and B indicates the positive plates, which might be separate plates or may consist, as shown, of portions of a single sheet bent in zigzag form. In either case the positive plates B are of known kind, consisting of copper wire - gauze electrolytically coated with zinc and mercury amalgam. Around each of the negative plates A, at some distance from their surfaces, is formed a porous casing C of non-conducting material, such as is not acted on by the exciting liquid. The walls of this casing may be made in various ways. For instance, each wall may consist of an open framing or a perforated sheet of ebonite or the like, on which is stretched asbestos C' or other fabric, or it may consist of two perforated sheets of ebonite or the like inclosing fabric between them. The casing extends some distance below the plate A, which is supported on wedge-shaped bars D, and the sides of the casing have their lower parts, which extend down beyond the plate A, made without perforation, there being thus formed under each negative plate a quiescent chamber E, which receives and retains such fragments of active material as may drop off the plate. The fragments which may thus fall into the chamber E being quite cut off by the non-conducting wall of the casing C from contact with the neighboring positive plates cannot effect short-circuiting. The lower edges of the positive plates B are held in troughs F, of non-conducting material which receive such of the mercury as may, during the action of the battery separate itself from the zinc amalgam and descend along the surface of the plates. When the battery is charged, zinc is deposited on the positive plates, and the mercury then ascends from the troughs F to combine in amalgam with the deposited zinc.

The plates A and B, casings C, and troughs F are all carried on an open framing G, under which is mounted a revolving agitator H. During the action of the battery this agitator, being caused by any convenient motor to revolve either continuously or from time to time, produces currents of the exciting liquid which tend to render it uniform throughout the cell.

For an electrolyte I use sulfate-of-zinc solution or dilute sulfuric acid.

In charging the battery the peroxid of lead of the negative plates is brought to the highest degree of oxidation, while zinc is deposited upon the positive plates. In discharging the battery the action is reversed, the negative plates giving off oxygen and zinc being dissolved off the positive plates.

Having thus described my invention, what I claim is—

In a secondary voltaic cell having negative plates in which lead oxid is the active material, and positive plates coated with amalgam of mercury and zinc, troughs in which said positive plates rest and in which the mercury is placed, and casings for the negative plates formed of porous non-conducting material inclosed between walls which surround the lower part of the plate, said walls having perforations except in their lower portions, substantially as described.

In testimony whereof I have signed my name to this specification, in the presence of two subscribing witnesses, this 16th day of December, A. D. 1895.

LUDWIG EPSTEIN.

Witnesses:
  OLIVER DUVALL,
  JNO. P. M. MILLARD.